No. 608,916. Patented Aug. 9, 1898.
E. RIVETT.
ANTIFRICTION BEARING.
(Application filed Aug. 14, 1897.)
(No Model.)
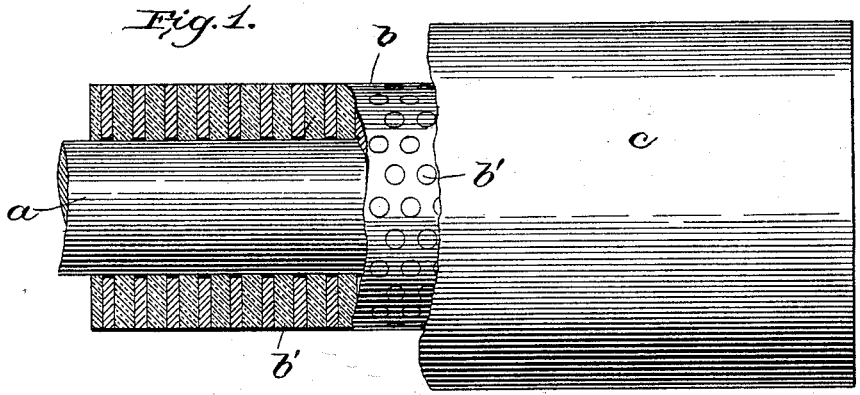
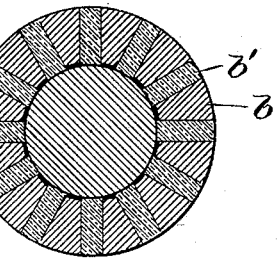
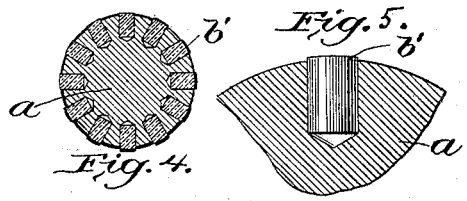
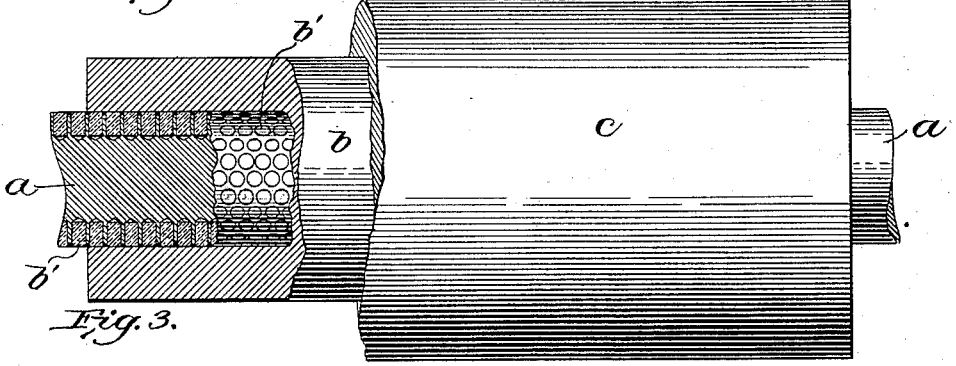
Witnesses:
Arthur T. Randall
Otis Lindquist.
Inventor:
Edward Rivett
by B. J. Noyes
Atty

UNITED STATES PATENT OFFICE.

EDWARD RIVETT, OF BOSTON, MASSACHUSETTS.

ANTIFRICTION-BEARING.

SPECIFICATION forming part of Letters Patent No. 608,916, dated August 9, 1898.

Application filed August 14, 1897. Serial No. 648,257. (No model.)

*To all whom it may concern:*

Be it known that I, EDWARD RIVETT, of Boston, county of Suffolk, State of Massachusetts, have invented an Improvement in Antifriction-Bearings, of which the following description, in connection with the accompanying drawings, is a specification, like letters on the drawings representing like parts.

This invention has for its object to improve the construction of antifriction-bearings or antifriction-bearing surfaces for shafts or any other bodies adapted to rotate, reciprocate, or otherwise move, whereby the friction is reduced to such an extent as to prevent injuriously heating the parts, and thereby impairing their utility, notwithstanding the shaft or other body may be moved at a very high rate of speed or may be very heavy.

The antifriction-bearing or antifriction-bearing surface embodying this invention is composed of or comprises a number of plugs or pegs of wood—as lignum-vitæ, for instance—set or fitted into perforations or sockets formed or provided in a suitable support, said wooden plugs or pegs slightly projecting beyond the face of said support to contact with the coöperating part. For instance, a bushing or sleeve may be formed or provided with a large number of perforations or sockets which are filled with wooden plugs or pegs which slightly project beyond the inner face, and the shaft in said bushing or sleeve will rest upon or contact with said projecting wooden plugs or pegs, they serving in such case as an antifriction-bearing for said shaft, or the shaft may be formed or provided with a number of sockets or perforations into which the wooden plugs or pegs may be driven, said plugs or pegs projecting beyond the circumference of the shaft, and said projecting plugs or pegs may contact with a suitable bushing or sleeve or box.

I find in practice that wooden plugs or pegs when thus held by a suitable support, as a bushing or sleeve, which is not liable to warp or twist, furnish an exceptionally good and efficient antifriction-bearing, and in case said bearing is used for a rotating shaft said shaft may be rotated one hundred and twenty-five thousand revolutions per minute without injuriously heating the parts, and thereby impairing their utility, such high speed having been already obtained by me.

Figure 1 shows in longitudinal section a bushing or sleeve having an antifriction-bearing therefor embodying this invention, a box for said bushing, and a shaft contained therein; Fig. 2, a cross-section of the bushing and antifriction-bearing shown in Fig. 1; Fig. 3, a modification showing a shaft provided with an antifriction-bearing embodying this invention; Fig. 4, a cross-section of the shaft shown in Fig. 3; Fig. 5, an enlarged detail view of a portion of the shaft $a$, showing one of the wooden pegs forming the antifriction-bearing.

Referring to Figs. 1 and 2, $a$ represents a shaft, $b$ a bushing or sleeve therefor, and $c$ a box for said bushing. The bushing $b$ is formed or provided with a number of perforations, herein shown as passing radially through it, and said perforations are filled with wooden plugs or pegs $b'$, as lignum-vitæ, for instance, and said wooden plugs or pegs are driven or otherwise set into said perforations and are caused to project slightly on the inner side or face of the bushing to thereby provide bearing-points for the shaft. There may be as many of these wooden plugs or pegs as desired, and they will preferably be made circular in cross-section and quite small in diameter. By setting them so that they will project slightly they will serve as bearing-points for the shaft, and said shaft will not come in contact with the bushing in such manner that friction will produce heat sufficient to injuriously affect the shaft and impair its utility. The shaft in this instance is really supported by said projecting plugs or pegs.

In practice I find that the antifriction-bearing thus provided permits the shaft to be rotated at a very high speed—say one hundred and twenty-five thousand revolutions per minute—without injuriously affecting any of the parts.

Referring to Figs. 3 and 4, the antifriction-bearing is provided by forming sockets in the shaft $a$ and driving wooden plugs or pegs $b'$ into the sockets thus formed or provided, said plugs or pegs projecting slightly beyond the circumference of the shaft, as in Figs. 1 and 2, and as shown in detail, Fig. 5, and in this instance the shaft serves as the support for the plugs or pegs.

From the foregoing it will be seen that it is my intention not to limit my invention to any particular form or construction of support for the wooden plugs or pegs which constitute my antifriction-bearing, but that for the practical success of my invention said plugs or pegs should project above or beyond the support sufficiently to provide bearing-points for the parts or members which may be placed thereon.

I claim—

An antifriction-bearing consisting of a cylinder provided with numerous small apertures, and wooden pegs set into said apertures and projecting therefrom to afford raised bearing-points, substantially as described.

In testimony whereof I have signed my name to this specification in the presence of two subscribing witnesses.

EDWARD RIVETT.

Witnesses:
  B. J. NOYES,
  ARTHUR F. RANDALL.